(12) United States Patent
Lee et al.

(10) Patent No.: US 12,341,305 B2
(45) Date of Patent: Jun. 24, 2025

(54) ELECTRONIC DEVICE COMPRISING CONNECTOR AND METHOD FOR SENSING DISCONNECTION

(71) Applicant: Samsung Electronics Co., Ltd., Gyeonggi-do (KR)

(72) Inventors: Jaehwan Lee, Gyeonggi-do (KR); Hoyeong Lim, Gyeonggi-do (KR); Cheolyoon Chung, Gyeonggi-do (KR); Hyunseok Kim, Gyeonggi-do (KR); Incheol Baek, Gyeonggi-do (KR); Yongseung Yi, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 443 days.

(21) Appl. No.: 17/968,088

(22) Filed: Oct. 18, 2022

(65) Prior Publication Data
US 2023/0044807 A1  Feb. 9, 2023

Related U.S. Application Data

(63) Continuation of application No. PCT/KR2021/004337, filed on Apr. 7, 2021.

(30) Foreign Application Priority Data

Apr. 20, 2020 (KR) .................. 10-2020-0047698

(51) Int. Cl.
*H01R 24/60* (2011.01)
*G06F 1/16* (2006.01)
(Continued)

(52) U.S. Cl.
CPC ........... *H01R 24/60* (2013.01); *G06F 1/1613* (2013.01); *H01R 13/6683* (2013.01); *H01R 13/70* (2013.01)

(58) Field of Classification Search
CPC .... H01R 24/60; H01R 13/6683; H01R 13/70; G06F 1/1613; G06F 13/4072; G06F 13/4081; H04M 1/02; H04M 1/0274
See application file for complete search history.

(56) References Cited

U.S. PATENT DOCUMENTS 6,417,776 B1 * 7/2002 Tagishi ............... H04L 25/0292
340/870.16
8,352,644 B2 1/2013 Malamant et al.
(Continued)

FOREIGN PATENT DOCUMENTS

JP 2010-287035 A 12/2010
JP 2014-522961 A 9/2014
(Continued)

*Primary Examiner* — Faisal M Zaman
(74) *Attorney, Agent, or Firm* — Cha & Reiter, LLC

(57) ABSTRACT

Disclosed is an electronic device including: a USB connector connected to a USB plug of an external device; a high-speed interface; a voltage source for supplying a voltage to the high-speed interface; a first circuit portion connected to a ground portion, and has a second impedance higher than a first impedance of the high-speed interface; and a processor. The processor is configured to monitor the external device by using the high-speed interface in a first interval of a first frame, form a disconnection sensing path by forming a connection between the first circuit portion and a second circuit portion of the external device, and use the disconnection sensing path to determine whether the connection between the USB connector and the USB plug has been disconnected. The second circuit portion may have a fourth impedance higher than a third impedance of an external high-speed interface. Various other embodiments are also possible.

20 Claims, 11 Drawing Sheets

(51) Int. Cl.
*H01R 13/66* (2006.01)
*H01R 13/70* (2006.01)

(56) References Cited

U.S. PATENT DOCUMENTS

| | | | |
|---|---|---|---|
| 8,626,980 | B2 | 1/2014 | Foster |
| 8,667,316 | B2 | 3/2014 | Foster |
| 8,683,091 | B2 * | 3/2014 | Chen ................ G06F 11/3055 |
| | | | 710/17 |
| 8,775,692 | B2 | 7/2014 | Manabe |
| 8,935,441 | B2 | 1/2015 | Manabe |
| 9,606,955 | B2 | 3/2017 | Chen et al. |
| 9,727,105 | B2 | 8/2017 | Lee et al. |
| 9,740,643 | B2 | 8/2017 | Singh |
| 10,198,386 | B2 | 2/2019 | Rand et al. |
| 10,489,324 | B2 | 11/2019 | Sporck et al. |
| 10,949,376 | B2 | 3/2021 | Lee et al. |
| 11,038,547 | B2 | 6/2021 | Lee et al. |
| 2002/0169915 | A1 * | 11/2002 | Wu .................... G06F 13/4081 |
| | | | 710/305 |
| 2007/0028127 | A1 * | 2/2007 | Kim .................... G06F 11/1443 |
| | | | 710/305 |
| 2010/0235655 | A1 * | 9/2010 | Tauscher ................ G06F 1/266 |
| | | | 710/14 |
| 2012/0059965 | A1 | 3/2012 | Foster |
| 2012/0324302 | A1 | 12/2012 | Arslan et al. |
| 2013/0179603 | A1 * | 7/2013 | Tu .......................... G06F 13/00 |
| | | | 710/15 |
| 2013/0198417 | A1 | 8/2013 | Takashima |
| 2013/0286523 | A1 * | 10/2013 | Mullins ................ H01R 13/641 |
| | | | 439/620.21 |
| 2014/0211862 | A1 | 7/2014 | Moghe et al. |
| 2016/0028252 | A1 * | 1/2016 | Bajpai .................. H02J 7/00714 |
| | | | 320/106 |
| 2017/0047749 | A1 * | 2/2017 | Cornelius ............. H02J 7/0045 |
| 2018/0097395 | A1 * | 4/2018 | Yoshida ..................... H02J 7/04 |
| 2019/0065422 | A1 | 2/2019 | Sporck et al. |
| 2019/0220430 | A1 | 7/2019 | Rand et al. |
| 2019/0303330 | A1 * | 10/2019 | Kagaya ................ G06F 13/4022 |
| 2019/0341786 | A1 | 11/2019 | Lee et al. |
| 2020/0250122 | A1 * | 8/2020 | Kagaya ................ G06F 13/4068 |
| 2020/0285601 | A1 | 9/2020 | Lee et al. |
| 2020/0313715 | A1 | 10/2020 | Lee et al. |
| 2020/0403433 | A1 | 12/2020 | Lee et al. |

FOREIGN PATENT DOCUMENTS

| | | |
|---|---|---|
| JP | 5628338 B2 | 11/2014 |
| JP | 5930025 B2 | 5/2016 |
| JP | 5963445 B2 | 8/2016 |
| KR | 10-0321761 B1 | 2/2002 |
| KR | 10-2015-0006123 A | 1/2015 |
| KR | 10-1537560 B1 | 7/2015 |
| KR | 10-1638760 B1 | 7/2016 |
| KR | 10-1646959 B1 | 8/2016 |
| KR | 10-2017-0098100 A | 8/2017 |
| KR | 10-2017-0120611 A | 10/2017 |
| KR | 10-2018-0013099 A | 2/2018 |
| KR | 10-2018-0092691 A | 8/2018 |
| KR | 10-2019-0044895 A | 5/2019 |
| KR | 10-2019-0061858 A | 6/2019 |

* cited by examiner

ELECTRONIC DEVICE COMPRISING CONNECTOR AND METHOD FOR SENSING DISCONNECTION

CROSS-REFERENCE TO RELATED APPLICATION(S)

This application is a continuation of International Application No. PCT/KR2021/004337, which was filed on Apr. 7, 2021, and claims priority to Korean Patent Application No. 10-2020-0047698, filed on Apr. 20, 2020, in the Korean Intellectual Property Office, the disclosure of which are incorporated by reference herein their entirety.

BACKGROUND

Technical Field

One or more embodiments disclosed herein generally relate to an electronic device including a connector and a method for sensing disconnection.

Description of Related Art

An electronic device may have a connector so as to be connected to an external device. For example, the electronic device may have a USB connector or receptable connected to a USB plug of the external device. When the USB plug of the external device is inserted into the USB connector of the electronic device, the electronic device may be connected to the external device via a wired interface so that the electronic device and the external device may perform various operations together. For example, when the external device is a headset, the electronic device may output sound via the external device. The electronic device may transmit and/or receive data to and/or from the external device, using the USB connection as a high speed interface.

In one example, the electronic device may determine whether the connection between the electronic device and the external device is released based on a change in the voltage level of the connector. For example, the electronic device may determine that the connection between the electronic device and the external device is released when change in the voltage level of the USB connector is equal to or greater than a specified value. The electronic device may sense whether the change in the voltage level of a connecting pin of the USB connector is equal to or greater than the specified value.

SUMMARY

The voltage level of a connector of an electronic device may be changed by external factors such as ambient temperature that is outside a specified temperature range, ambient humidity that is outside a specified humidity range, and/or movement of an external device. For example, when a headset connected to the electronic device is moved while the ambient temperature and/or humidity is high, the impedance between the USB connector of the electronic device and the USB plug of the headset may change, and so that the voltage level of a connecting pin of the USB connector of the electronic device may change.

When the change in the voltage level of the connecting pin of the USB connector is equal to or greater than a specified value, the electronic device may erroneously determine that connection between the electronic device and an external device is released even when the USB connector of the electronic device and the USB plug of the headset are still actually connected to each other. Accordingly, the connection between the electronic device and the external device may be released by the external environment even while the USB plug of the headset is inserted into the USB connector of the electronic device. For example, when the USB connection is used as a high speed interface, the USB connector has a relatively low impedance. In this case, the voltage level of the USB connector may be easily changed by the external environment to the point that the change may generate false signals as described above.

For example, there may be high speed devices and full speed devices that can be connected to the electronic device via USB. The impedance and voltage level of a data line for transmitting and receiving data of the electronic device may be changed based on the connected external device. A relatively low impedance and a low voltage level may be applied to the data line in USB high speed mode interface when a USB high speed device is used, compared to USB full speed mode interface that uses a USB full speed device. Accordingly, in the USB high speed mode, the external environment may cause a larger variation in the voltage level of the data line of the USB device.

The high speed interface mentioned in the instant disclosure may refer to the USB high speed mode interface.

An electronic device according to an embodiment disclosed in the disclosure includes a housing, a USB connector formed at one side of the housing and connected to a USB plug of an external device, a high speed interface for transmitting and/or receiving data to and/or from the external device connected to the USB connector, a voltage source for supplying a first voltage to the high speed interface, a first circuit portion connected to a ground portion having a second voltage lower than the first voltage and having a second impedance higher than a first impedance of the high speed interface, and a processor, the processor monitors the external device using the high speed interface in a first section of a first frame, transmits and/or receives the data to and/or from the external device using the high speed interface in the first section, connects the first circuit portion to a second circuit portion of the external device so as to form a disconnection sensing path in at least a portion of a second section other than the first section in the first frame, and determines whether a connection between the USB connector and the USB plug is released using the disconnection sensing path, and the second circuit portion has a fourth impedance higher than a third impedance of an external high speed interface of the external device.

In addition, a method for sensing disconnection of an electronic device according to another embodiment disclosed in the disclosure includes monitoring an external device using a high speed interface with a first impedance in a first section of a first frame, transmitting and/or receiving data to and/or from the external device using the high speed interface in the first section, connecting a first circuit portion having a second impedance higher than the first impedance to a second circuit portion of the external device so as to form a disconnection sensing path in at least a portion of a second section other than the first section in the first frame, and determining whether a connection between a USB connector and a USB plug is released using the disconnection sensing path, and the second circuit portion has a fourth impedance higher than a third impedance of an external high speed interface of the external device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

In connection with the description of the drawings, the same or similar reference numerals may be used for the same or similar components.

DETAILED DESCRIPTION

According to certain embodiments disclosed herein, provided are a method for sensing disconnection that reduces erroneous determinations that the connection between the electronic device and the external device is released caused by the external environment while the external device is connected to the connector of the electronic device, and an electronic device implementing the same.

According to certain embodiments disclosed herein, using the disconnection sensing path with impedance higher than that of the high speed interface, erroneous determinations that the connection between the electronic device and the external device is released caused by the external environment while the USB plug of the external device is plugged into the USB connector of the electronic device may be reduced. Accordingly, the electronic device and the external device may be stably connected to each other.

In addition, according to certain embodiments disclosed herein, the electronic device may transmit and/or receive the data to and/or from the external device using the high speed interface. The high speed interface may transmit and/or receive more data than other more conventional interfaces. Accordingly, the quality of operations performed by the external device may be improved. For example, when the external device is the headset, the electronic device may output high-quality sound via the external device.

Hereinafter, certain embodiments of the disclosure are described with reference to the accompanying drawings. However, it is not intended to limit the disclosure to specific embodiments, and it should be understood to cover various modifications, equivalents, and/or alternatives of the embodiments of the disclosure.

Figure 1:
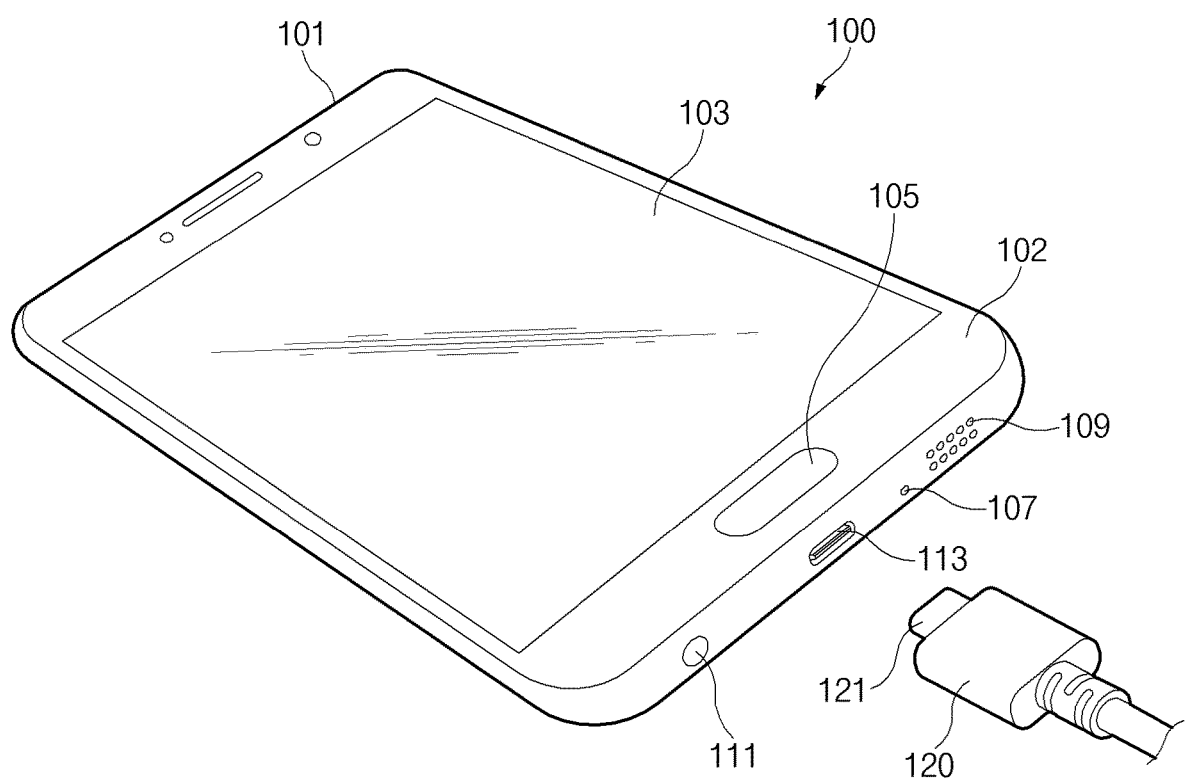
FIG. 1 is a view showing an operation of plugging a USB plug into a USB connector of an electronic device according to an embodiment.

FIG. 1 is a view 100 showing the operation of plugging a USB plug 120 into a USB connector 113 of an electronic device 101 according to an embodiment. The electronic device 101 according to an embodiment may include a housing 102, a display 103, an input key 105, a microphone hole 107, a speaker hole 109, an earphone jack 111, and/or the USB connector 113. In another embodiment, the electronic device 101 may omit at least one (e.g., the input key 105 and/or the earphone jack 111) of the components or additionally include other components.

In one embodiment, the display 103 may be implemented as the front surface of the electronic device 101. Edges of the display 103 may have substantially the same shape as the outer edges of the front surface of the housing 102 of the electronic device 101. The display 103 may display screens or other content. The display 103 may extend to the edges of the front surface of the electronic device 101 and a portion of the side surface of the electronic device. When the display 103 extends to the edge of the front surface of the electronic device 101, a camera (e.g., a camera module 980 in FIG. 9), a sensor (e.g., a sensor module 976 in FIG. 9), and/or the input key 105 may be arranged so as not to overlap the display 103.

In one embodiment, the input key 105 may be disposed on the front surface and/or the side surface of the electronic device 101. The input key 105 may acquire user touch inputs. For example, the input key 105 may be a physical key formed on the housing 102 of the electronic device 101. As another example, the input key 105 may be implemented as a soft key displayed on the display 103. When touched or pressed by the user, the input key 105 may activate the display 103 to be in standby.

In one embodiment, the microphone hole 107 may be disposed in the side surface of the electronic device 101. A microphone (e.g., the input device 950 in FIG. 9) may be disposed inside the microphone hole 107. The microphone hole 107 may acquire external sound.

In one embodiment, the speaker hole 109 may be disposed in the side surface of the electronic device 101. A speaker (e.g., the sound output device 955 in FIG. 9) may be disposed inside the speaker hole 109. The speaker hole 109 may output sound to the outside.

In one embodiment, the earphone jack 111 may be disposed in the side surface of the electronic device 101. The earphone jack 111 may accommodate an earphone terminal therein. The earphone jack 111 may transmit and/or receive audio signals to and/or from one or more earphones or headphones.

In one embodiment, the USB connector 113 may be disposed in the side surface of the electronic device 101. For example, the USB connector 113 may be disposed at the lower end of the side surface of the housing 102 of the electronic device 101. The USB plug 120 may be plugged into the USB connector 113. For example, the USB connector 113 may accommodate a USB terminal 121 of the USB plug 120 therein. When the USB plug 120 is inserted into the USB connector 113, the USB terminal 121 may be coupled to the USB connector 113.

Figure 3:
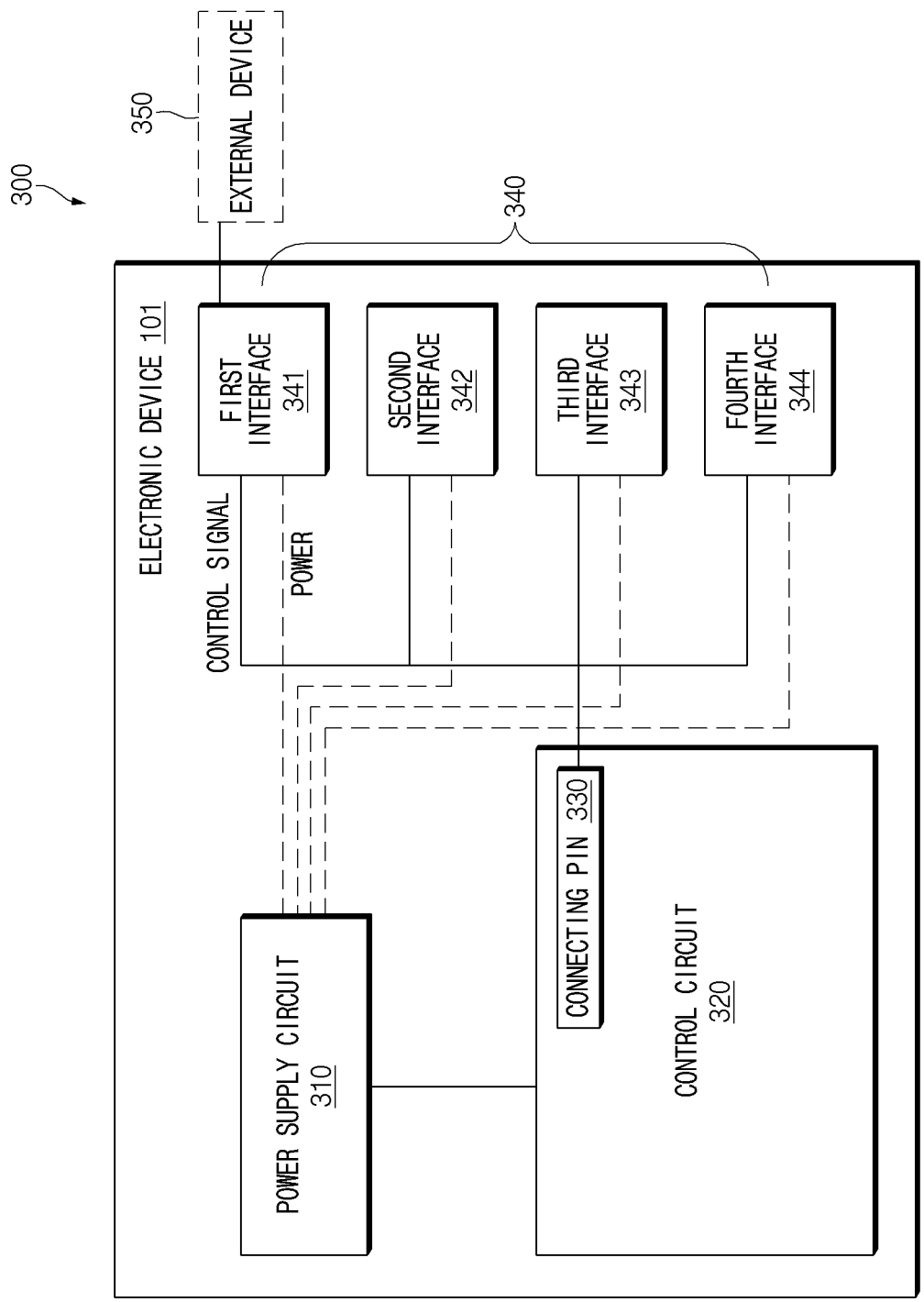
FIG. 3 is a block diagram showing an electronic device according to an embodiment.

In one embodiment, the USB connector 113 may transmit and/or receive power and/or data to and/or from an external device (e.g., the external device 350 in FIG. 3). The external device 350 may be various types of peripheral devices connected to the electronic device 101 via a wired interface through the USB plug 120. For example, the external device 350 may be the peripheral device, such as a desktop PC, a laptop computer, a tablet, an external hard drive, a speaker, a headset, earphones, and an auxiliary battery.

In one embodiment, the electronic device 101 may be connected to the external device 350 having the USB plug 120 via the USB connector 113. The electronic device 101 may perform various operations with the external device 350. For example, when the external device 350 is the headset, the electronic device 101 may output sound via the external device 350. When the electronic device 101 is able to be connected to the headset via the USB connector 113, the earphone jack 111 may be omitted from the electronic device 101. Accordingly, aesthetics and robustness of the electronic device 101, in particular its external appearance, may be improved by omitting the earphone jack 111 from the electronic device 101.

Figure 2:
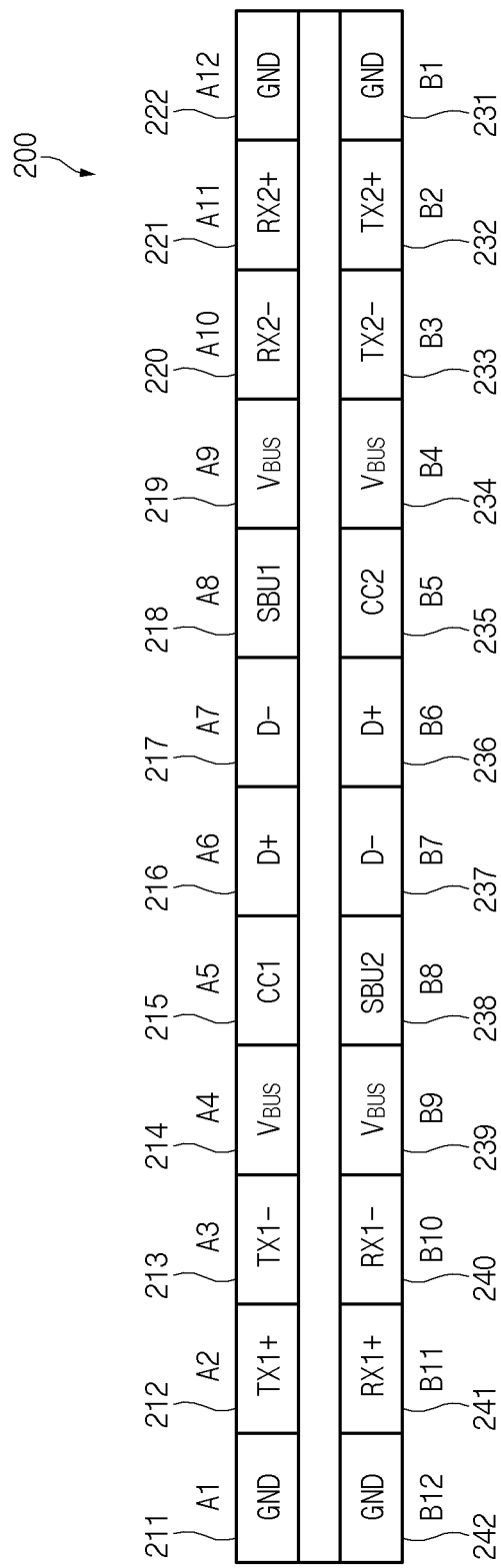
FIG. 2 is a view showing a plurality of connecting pins of a USB connector of an electronic device according to an embodiment.

FIG. 2 is a view 200 showing a plurality of connecting pins 211, 212, 213, 214, 215, 216, 217, 218, 219, 220, 221, 222, 231, 232, 233, 234, 235, 236, 237, 238, 239, 240, 241, and 242 of a USB connector (e.g., the USB connector 113 in FIG. 1) of an electronic device (e.g., the electronic device 101 in FIG. 1) according to an embodiment. As one example, the USB connector 113 in FIG. 2 is USB Type-C. The plurality of connecting pins 211, 212, 213, 214, 215, 216, 217, 218, 219, 220, 221, 222, 231, 232, 233, 234, 235, 236, 237, 238, 239, 240, 241, and 242 may include the A1 pin 211, the A2 pin 212, the A3 pin 213, the A4 pin 214, the A5 pin 215, the A6 pin 216, the A7 pin 217, the A8 pin 218, the A9 pin 219, the A10 pin 220, the A11 pin 221, the Al2 pin 222, the B1 pin 231, the B2 pin 232, the B3 pin 233, the B4 pin 234, the B5 pin 235, the B6 pin 236, the B7 pin 237, the B8 pin 238, the B9 pin 239, the B10 pin 240, the B11 pin 241, and the B12 pin 242. In another embodiment, instead of the USB connector, the physical connector of the electronic device may be a lightning connector.

In one embodiment, the A1 pin 211 may be a connecting pin for returning the voltage level of the USB connector 113 to ground voltage level. The A1 pin 211 may be referred to as the GND pin.

In one embodiment, the A2 pin 212 may be the super speed first differential pair positive connecting pin defined in USB Type-C. The A2 pin 212 may transmit signal and/or data to the external device (e.g., the external device 350 in FIG. 3). The A2 pin 212 may be referred to as the TX1+ pin.

In one embodiment, the A3 pin 213 may be the super speed first differential pair negative connecting pin. The A3 pin 213 may transmit signal and/or data to the external device 350. The A3 pin 213 may be referred to as the TX1− pin.

In one embodiment, the A4 pin 214 may be a connecting pin that supplies bus power to the external device 350 or receives the bus power from the external device 350. The A4 pin 214 may be referred to as the VBUS pin.

In one embodiment, the A5 pin 215 may be the first configuration channel connecting pin as defined in USB Type-C. The USB configuration channel connecting pin may sense connection and/or disconnection between the USB connector 113 and a USB terminal (e.g., the USB terminal 121 in FIG. 1) of the external device 350. The configuration channel connecting pin of the USB may determine whether a connection direction of the USB connector 113 and the USB terminal 121 is correct. The USB configuration channel connecting pin may be used to correctly establish the connection between the USB connector 113 and the USB terminal 121. The A5 pin 215 may be referred to as the CC1 pin.

In one embodiment, the A6 pin 216 may be the first differential pair positive connecting pin defined in USB 2.0. The A6 pin 216 may be referred to as the D+ pin.

In one embodiment, the A7 pin 217 may be the first differential pair negative connecting pin defined in USB 2.0. The A7 pin 217 may be referred to as the D-pin.

In one embodiment, the A8 pin 218 may be the first sideband use connecting pin. The A8 pin 218 may be referred to as the SBU1 pin.

In one embodiment, the A9 pin 219 may be a connecting pin that supplies the bus power to the external device 350 or receives the bus power from the external device 350. The A9 pin 219 may be referred to as the VBUS pin.

In one embodiment, the A10 pin 220 may be the super speed second differential pair negative connecting pin. The A10 pin 220 may receive signal and/or data from the external device 350. The A10 pin 220 may be referred to as the RX2− pin.

In one embodiment, the A11 pin 221 may be the super speed second differential pair positive connecting pin. The A11 pin 221 may receive signal and/or data from the external device 350. The A11 pin 221 may be referred to as the RX2+ pin.

In one embodiment, the Al2 pin 222 may be a connecting pin for returning the voltage level of the USB connector 113 to the ground voltage level. The Al2 pin 222 may be referred to as the GND pin.

In one embodiment, the B1 pin 231 may be a connecting pin for returning the voltage level of the USB connector 113 to the ground voltage level. The B1 pin 231 may be referred to as the GND pin.

In one embodiment, the B2 pin 232 may be the super speed third differential pair positive connecting pin. The B2 pin 232 may transmit signal and/or data to the external device 350. The B2 pin 232 may be referred to as the TX2+ pin.

In one embodiment, the B3 pin 233 may be the super speed third differential pair negative connecting pin. The B3 pin 233 may transmit signal and/or data to the external device 350. The B3 pin 233 may be referred to as the TX2− pin.

In one embodiment, the B4 pin 234 may be a connecting pin that supplies the bus power to the external device 350 or receives the bus power from the external device 350. The B4 pin 214 may be referred to as the VBUS pin.

In one embodiment, the B5 pin 235 may be the second configuration channel connecting pin as defined in USB Type-C. The B5 pin 235 may be referred to as the CC2 pin.

In one embodiment, the B6 pin 236 may be the second differential pair positive connecting pin defined in the USB 2.0. The B6 pin 236 may be referred to as the D+ pin.

In one embodiment, the B7 pin 237 may be the second differential pair negative connecting pin defined in the USB 2.0. The B7 pin 237 may be referred to as the D-pin.

In one embodiment, the B8 pin 238 may be the second sideband use connecting pin. The B8 pin 238 may be referred to as the SBU2 pin.

In one embodiment, the B9 pin 239 may be a connecting pin that supplies the bus power to the external device 350 or receives the bus power from the external device 350. The B9 pin 239 may be referred to as the VBUS pin.

In one embodiment, the B10 pin 240 may be the super speed fourth differential pair negative connecting pin. The B10 pin 240 may receive signal and/or data from the external device 350. The B10 pin 240 may be referred to as the RX1− pin.

In one embodiment, the B11 pin 241 may be the super speed fourth differential pair positive connecting pin. The B11 pin 241 may receive signal and/or data from the external device 350. The B11 pin 241 may be referred to as the RX1+ pin.

In one embodiment, the B12 pin 242 may be a connecting pin for returning the voltage level of the USB connector 113 to the ground voltage level. The B12 pin 242 may be referred to as the GND pin.

FIG. 3 is a block diagram 300 showing the electronic device 101 according to an embodiment. The electronic device 101 according to an embodiment may include a power supply circuit 310, a control circuit 320 including a connecting pin 330, and an interface 340. The interface 340 may include a first interface 341, a second interface 342, a third interface 343, and/or a fourth interface 344.

In one embodiment, the electronic device 101 may recognize the external device 350 connected to the interface 340. For example, the electronic device 101 may recognize the external device 350 connected to the first interface 341. The first interface 341 may be USB-Type C high speed interface. The control circuit 320 may be connected to the first interface 341 via the connecting pin 330. For example, the connecting pin 330 may be a physical pin connected to the control circuit (e.g., an integrated circuit (IC)) 320. The connecting pin 330 may be composed of a plurality of pins. Each interface (e.g., the first interface 341, the second interface 342, the third interface 343, and the fourth interface 344) may be connected to at least one of the plurality of pins.

In one embodiment, the power supply circuit 310 may supply power to the external device 350 via the first interface 341. For example, the power supply circuit 310 may supply the power to the external device 350 via a VBUS pin (e.g., the VBUS pins 214, 219, 234, and 239 in FIG. 2). The power supply circuit 310 may include an adapter that converts AC power into DC power. The power supply circuit 310 may include a battery or be connected to a separate battery.

In one embodiment, the control circuit 320 may determine maximum power and/or maximum current that may be supplied to the external device 350. The control circuit 320 may be connected to the external device 350 via the connecting pin 330. The control circuit 320 may obtain information regarding the external device 350 or perform communication with the external device 350.

In one embodiment, the connecting pin 330 may be connected to the interface 340. The connecting pin 330 may be a CC pin (e.g., the CC1 pin 215 and/or the CC2 pin 235 in FIG. 2) connected to the control circuit 320. The control circuit 320 may determine whether the external device 350 is connected via the connecting pin 330. The connecting pin 330 may sense connection and/or disconnection of the external device 350.

In one embodiment, the first interface 341 may be a receptacle that may be connected to a USB plug (e.g., the USB plug 120 in FIG. 1) of the external device 350.

In one embodiment, the connecting pin 330 or the first interface 341 may be connected to high level voltage. The connecting pin 330 or the first interface 341 may be connected to a pull-up resistor that raises the voltage level of the USB connector 113. The connecting pin 330 or the first interface 341 may alternatively be connected to low level voltage by being connected to a pull-down resistor that lowers the voltage level of the USB connector 113.

Figure 4A:
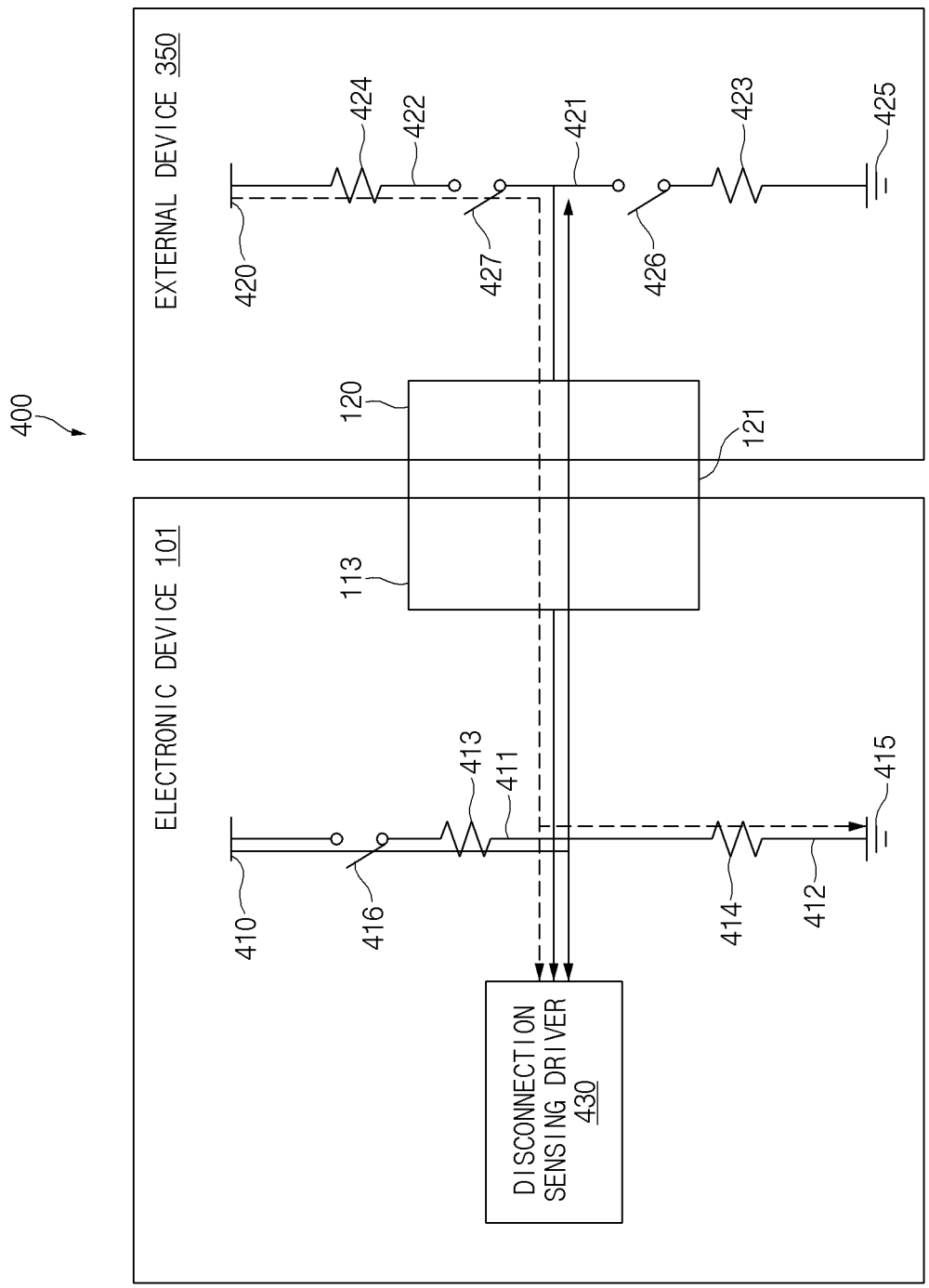
FIG. 4A is a view showing a state in which a USB plug of an external device is plugged into a USB connector of an electronic device according to an embodiment.

FIG. 4A is a view 400 showing a state in which the USB plug 120 of the external device 350 is plugged into the USB connector 113 of the electronic device 101 according to an embodiment. The electronic device 101 according to an embodiment may include a voltage source 410, a high speed interface 411, a first circuit portion 412, a ground portion 415, and a disconnection sensing driver 430. The external device 350 according to an embodiment may include an external voltage source 420, an external high speed interface 421, a second circuit portion 422, and an external ground portion 425.

In one embodiment, the voltage source 410 may supply a first voltage to the high speed interface 411. The first voltage may have a voltage level equal to or higher than about 750 mV and equal to or lower than about 850 mV. For example, the first voltage may be about 800 mV.

In one embodiment, the high speed interface 411 may be connected to the voltage source 410. The high speed interface 411 may be connected to the USB connector 113. The high speed interface 411 may be connected to the external high speed interface 421 of the external device 350 via the USB connector 113. The high speed interface 411 and the external high speed interface 421 may form a data transmission/reception path (a double-headed arrow path in FIG. 4A). For example, when the external device 350 is the headset, the high speed interface 411 may transmit data for playing sound such as music to the external device 350. As another example, when sensing whether the connection of the external device 350 is released from the external device 350, the high speed interface 411 may receive data related to whether the connection of the external device 350 is released from the external device 350.

In one embodiment, a first impedance 413 may be connected to the voltage source 410 having the first voltage. The first impedance 413 may be the pull-up resistor connected to the voltage source 410. The first impedance 413 may have a value equal to or higher than about 40Ω and equal to or lower than about 50Ω. For example, the first impedance 413 may be about 45Ω.

In one embodiment, a first switch 416 may be connected to the voltage source 410 having the first voltage. The first switch 416 may selectively connect the high speed interface 411 to the USB connector 113. When the first switch 416 is closed, the high speed interface 411 may be connected to the USB connector 113. When the first switch 416 is opened, the transmission and/or the reception of the data via the high speed interface 411 may be prevented. A processor (e.g., the processor 920 in FIG. 9) of the electronic device 101 may control the opening/closing timing of the first switch 416. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In one embodiment, the first circuit portion 412 may be connected to the USB connector 113. The first circuit portion 412 may be connected to the second circuit portion 422 of the external device 350 via the USB connector 113.

In one embodiment, the first circuit portion 412 and the second circuit portion 422 may form a disconnection sensing path (a dotted arrow path in FIG. 4A). The disconnection sensing path may sense when the connection between the USB connector 113 and the USB plug 120 of the external device 350 is released. The disconnection sensing path may be connected to the disconnection sensing driver 430. The disconnection sensing path may be used so that the disconnection sensing driver 430 can detect or sense when the connection between the USB connector 113 of the electronic device 101 and the USB plug 120 of the external device 350 is released.

In one embodiment, the first circuit portion 412 may be connected to the ground portion 415. The ground portion 415 may have a second voltage lower than the first voltage. For example, the ground portion 415 may have the ground voltage level of about 0 V.

In one embodiment, the first circuit portion 412 may have a second impedance 414. The second impedance 414 may be the pull-down resistor connected to the ground portion 415.

In one embodiment, the second impedance 414 may have a higher value than the first impedance 413. The second impedance 414 may have a value equal to or higher than about 14 kΩ and equal to or lower than about 16Ω For example, the second impedance 414 may be about 15 kΩ.

In one embodiment, the external high speed interface 421 may be connected to the external ground portion 425. The external ground portion 425 may have the second voltage. For example, the external ground portion 425 may have the ground voltage level of about 0 V. The voltage level of the external ground portion 425 may be substantially the same as the voltage level of the ground portion 415. The external high speed interface 421 may be connected to the USB plug 120. The external high speed interface 421 may transmit and/or receive the data to and/or from the electronic device 101.

In one embodiment, a third impedance 423 may be connected to the external ground portion 425 having the second voltage. The third impedance 423 may be the pull-down resistor connected to the external ground portion 425. The third impedance 423 may have a value equal to or higher than about 40Ω and equal to or lower than about 50Ω. For example, the third impedance 423 may be about 45Ω. The third impedance 423 may have substantially the same value as the first impedance 413.

In one embodiment, a second switch 426 may be connected to the external ground portion 425 having the second voltage. The second switch 426 may selectively connect the external high speed interface 421 to the USB plug 120. When the second switch 426 is closed, the external high speed interface 421 may be connected to the USB plug 120. When the second switch 426 is opened, transmission and/or reception of data via the external high speed interface 421 may be prevented. The processor 920 of the electronic device 101 may control the opening/closing timing of the second switch 426.

In one embodiment, the high speed interface 411 and the external high speed interface 421 may be impedance matched with each other. For example, the high speed interface 411 and the external high speed interface 421 may be matched with each other to have an impedance of about 90Ω to operate. The high speed interface 411 and the external high speed interface 421 may be connected to each other to form the data transmission/reception path between the electronic device 101 and the external device 350.

In one embodiment, the second circuit portion 422 may be connected to the USB plug 120. The second circuit portion 422 may be connected to the first circuit portion 412 of the electronic device 101 via the USB plug 120. The second circuit portion 422 and the first circuit portion 412 may form the disconnection sensing path. The disconnection sensing path may be used to sense when the connection between the USB plug 120 of the external device 350 and the USB connector 113 of the electronic device 101 is released. The disconnection sensing path may be used to so that the disconnection sensing driver 430 of the electronic device 101 can sense when the connection between the USB plug 120 of the external device 350 and the USB connector 113 of the electronic device 101 is released.

In one embodiment, the second circuit portion 422 may be connected with the external voltage source 420. The external voltage source 420 may supply third voltage to the second circuit portion 422. The third voltage may have a voltage level equal to or higher than about 3.2 V and equal to or lower than about 3.4 V. For example, the third voltage may be about 3.3 V.

In one embodiment, the second circuit portion 422 may have a fourth impedance 424. The fourth impedance 424 may be the pull-up resistor connected to the external voltage source 420.

In one embodiment, the fourth impedance 424 may have a higher value than the third impedance 423. The fourth impedance 424 may have a value equal to or higher than about 1.4 kΩ and equal to or lower than about 1.6Ω. For example, the fourth impedance 424 may be about 1.5 kΩ.

In one embodiment, the second circuit portion 422 may have a third switch 427. The third switch 427 may selectively connect the second circuit portion 422 to the USB plug 120. When the third switch 427 is closed, the second circuit portion 422 may be connected to the USB plug 120. When the third switch 427 is opened, the connection between the second circuit portion 422 and the USB plug 120 may be released. The processor 920 of the electronic device 101 may control the opening/closing timing of the third switch 427.

In one embodiment, the disconnection sensing driver 430 may monitor whether the USB connector 113 of the electronic device 101 and the USB plug 120 of the external device 350 are connected to each other. The disconnection sensing driver 430 may monitor whether the electronic device 101 and the external device 350 are connected to each other using the data transmission/reception path (the double-headed arrow path in FIG. 4A) to which the high speed interface 411 and the external high speed interface 421 are connected. The disconnection sensing driver 430 may determine whether the data is transmitted at a specified interval through the data transmission/reception path to which the high speed interface 411 and the external high speed interface 421 are connected. The data may be USB data and/or sound data to be output from the headset. The disconnection sensing driver 430 may transmit, to the processor 920, information on whether the data is transmitted at the specified interval through the data transmission/reception path to which the high speed interface 411 and the external high speed interface 421 are connected.

In one embodiment, when the data is transmitted at the specified interval, the processor 920 may close the first switch 416, close the second switch 426, and open the third switch 427. When the data is transmitted at the specified interval, the processor 920 may determine that the connection between the USB connector 113 of the electronic device 101 and the USB plug 120 of the external device 350 is maintained, and may maintain the data transmission and reception path to which the high speed interface 411 and the external high speed interface 421 are connected.

In one embodiment, when a voltage out of a specified voltage range is sensed in the USB connector 113, the processor 920 may open the first switch 416, open the second switch 426, and close the third switch 427. The processor 920 may pull-down the voltage level of the USB connector 113 in the electronic device 101 and pull-up the voltage level of the USB plug 120 in the external device 350. When the voltage out of the specified voltage range is sensed in the USB connector 113, the processor 920 may connect the first circuit portion 412 and the second circuit portion 422 to each other so as to form the disconnection sensing path (the dotted arrow path in FIG. 4A) to determine whether the connection between the USB connector 113 of the electronic device 101 and the USB plug 120 of the external device 350 is released. When sensing a signal flowing through the disconnection sensing path (the dotted arrow path in FIG. 4A), whether the connection between the USB connector 113 of the electronic device 101 and the USB plug 120 of the external device 350 is released may be identified. For example, the signal flowing through the disconnection sensing path (the dotted arrow path in FIG. 4A) may be sensed using an external sensing device. The processor 920 may determine whether the connection between the USB connector 113 of the electronic device 101 and the USB plug 120 of the external device 350 is released using the disconnection sensing path.

In one embodiment, the processor 920 may connect the first circuit portion 412 and the second circuit portion 422 to each other to form the disconnection sensing path, and then determine that the connection between the USB connector 113 of the electronic device 101 and the USB plug 120 of the external device 350 is released when the voltage level of the USB connector 113 changes by a specified value or greater. For example, when the voltage level of the USB connector 113 decreases from about 3.0 V to be equal to or lower than 0.7 V after forming the disconnection sensing path, the processor 920 may determine that the connection between the USB connector 113 of the electronic device 101 and the USB plug 120 of the external device 350 is released. The second impedance 414, which is the pull-down resistor of the electronic device 101, may have the higher value than the first impedance 413 of the high speed interface 411, and the fourth impedance 424, which is the pull-up resistor of the external device 350, may have the higher value than the third impedance 423 of the external high speed interface 421. Accordingly, the USB connector 113 of the electronic device 101 may increase the tolerance in the change in the voltage level caused by the external environment, such as ambient temperature out of a specified temperature range, ambient humidity out of a specified humidity range, and/or movement of the external device.

In one embodiment, when the first circuit portion 412 and the second circuit portion 422 are connected to each other to form the disconnection sensing path, and then the voltage level of the USB connector 113 is maintained within a specified range, the processor 920 may close the first switch 416, close the second switch 426, and open the third switch 427. When the voltage level of the USB connector 113 is maintained within the specified range after forming the disconnection sensing path, the processor 920 may determine that there has been a temporary change in the data transmission state caused by the external environment while the connection between the USB connector 113 of the electronic device 101 and the USB plug 120 of the external device 350 is maintained. The processor 920 may connect the electronic device 101 and the external device 350 to each other by connecting the high speed interface 411 and the external high speed interface 421 to each other to form the data transmission/reception path (the double-headed arrow path in FIG. 4A).

In one embodiment, the processor 920 may use the data transmission/reception path and the disconnection sensing path at the same time. The processor 920 may use the USB high speed mode interface and the USB full speed mode interface so as to sense whether connection for the USB high speed mode is released. The processor 920 may additionally use the USB full speed mode interface so as to monitor whether the connection for the USB high speed mode is released. The processor 920 may use the data transmission/reception path and the disconnection sensing path at the same time. The processor 920 may more accurately sense whether the connection for the USB high speed mode is released by additionally using the full speed mode interface when sensing that the connection for the USB high speed mode is released.

Figure 4B:
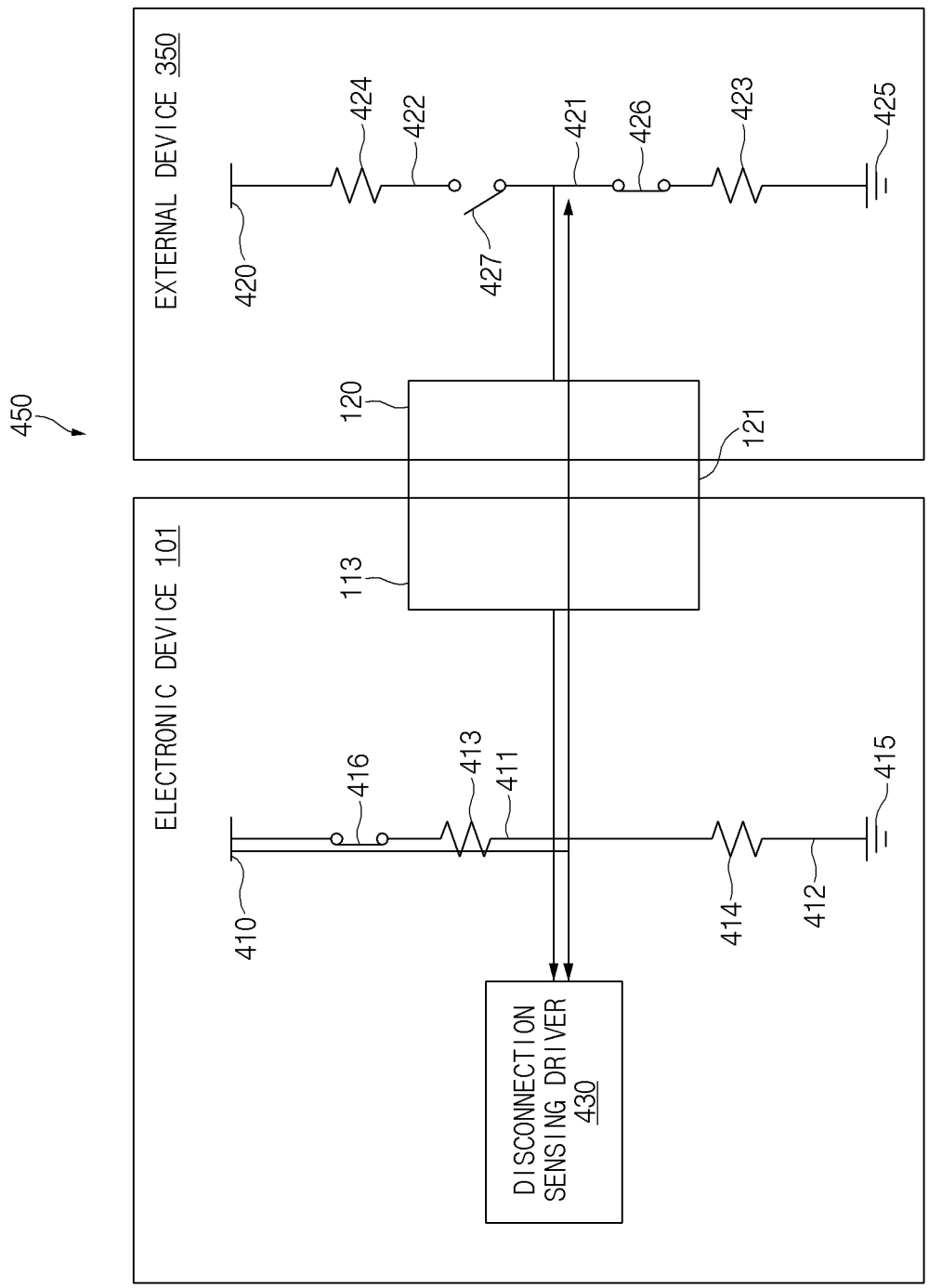
FIG. 4B is a view showing a state in which an electronic device and an external device are connected to each other via a data transmission/reception path according to an embodiment.

FIG. 4B is a view 450 showing a state in which the electronic device 101 and the external device 350 are connected to each other via a data transmission/reception path according to an embodiment.

In one embodiment, the processor 920 may close the first switch 416, close the second switch 426, and open the third switch 427 when the data is transmitted at the specified interval. The processor 920 may connect the high speed interface 411 and the external high speed interface 421 to each other to form a data transmission/reception path (the double-headed arrow path in FIG. 4B). The processor 920 may transmit and/or receive the data to and/or from the external device 350. For example, when the external device 350 is the headset, the high speed interface 411 may transmit the data for playing sound such as the music to the external device 350. As another example, when sensing that the connection of the external device 350 is released from the external device 350, the high speed interface 411 may receive data related to whether the connection of the external device 350 is released from the external device 350.

Figure 4C:
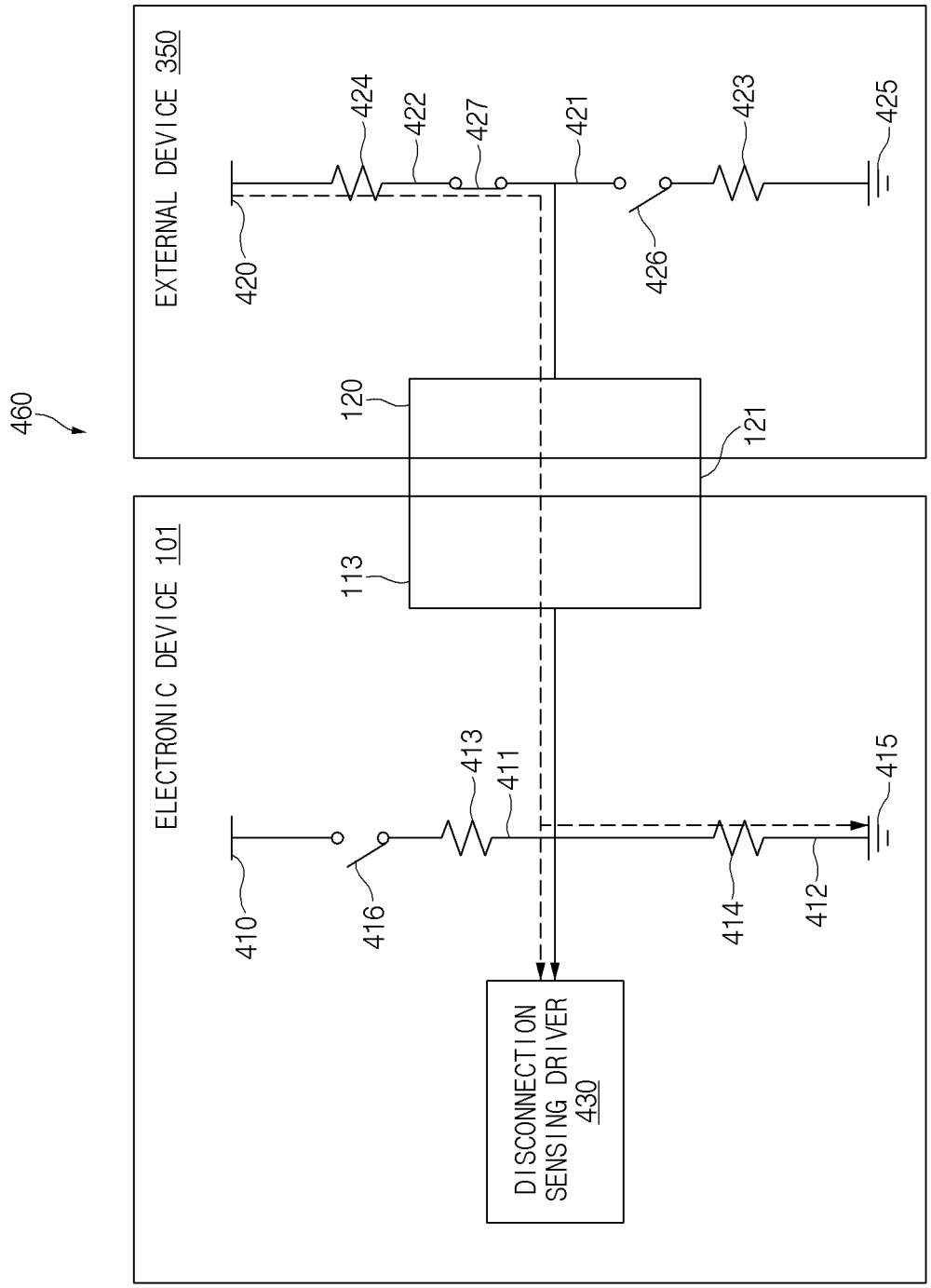
FIG. 4C is a view showing a state in which an electronic device and an external device are connected to each other via a disconnection sensing path according to an embodiment.

FIG. 4C is a view 460 showing a state in which the electronic device 101 and the external device 350 are connected to each other via a disconnection sensing path according to an embodiment.

In one embodiment, when the voltage out of the specified voltage range is sensed in the USB connector 113, the processor 920 may open the first switch 416, open the second switch 426, and close the third switch 427. The processor 920 may connect the first circuit portion 412 and the second circuit portion 422 to each other to form a disconnection sensing path (the dotted arrow path in FIG. 4C). The processor 920 may determine whether the connection between the electronic device 101 and the external device 350 is released by determining whether the voltage level of the USB connector 113 changes by the specified value or greater.

In one embodiment, a sensed voltage level for high speed mode interface connection may be reduced by external factors such as shaking of the external device 350. When the sensed voltage level for the high speed mode interface connection decreases, there is no abnormality in data transmission from the electronic device 101 to the external device 350, but it is set to turn off communication between the electronic device 101 and the external device 350 according to the USB communication standard. The processor 920 may additionally activate the disconnection sensing path (the dotted arrow path in FIG. 4C) that is the full speed mode interface before turning off the communication between the electronic device 101 and the external device 350. The processor 920 may additionally determine whether the connection between the electronic device 101 and the external device 350 is released using the disconnection sensing path.

Figure 5:
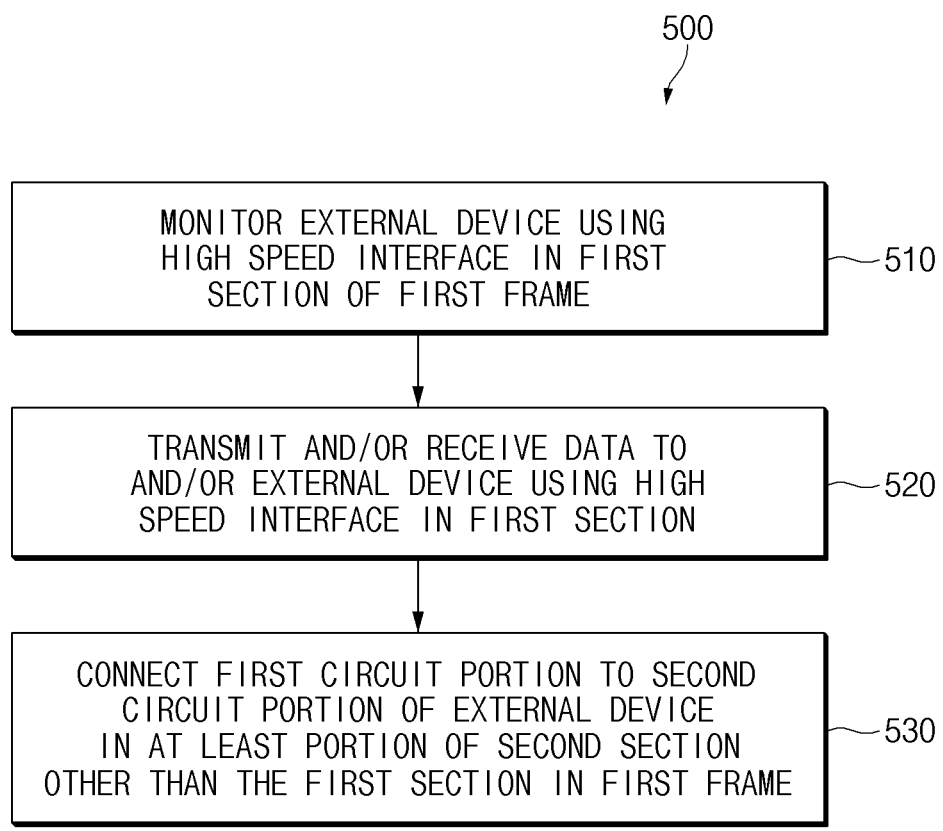
FIG. 5 is a flowchart showing a method for sensing disconnection of an electronic device according to an embodiment.

FIG. 5 is a flowchart 500 showing a method for sensing disconnection of an electronic device (e.g., the electronic device 101 in FIG. 4A) according to an embodiment.

In operation 510, a processor (e.g., the processor 920 in FIG. 9) of the electronic device 101 according to an embodiment may monitor an external device (e.g., the external device 350 in FIG. 4A) using the high speed interface in a first section of a first frame. The first section may be a section in which a USB connector (e.g., the USB connector 113 in FIG. 4A) of the electronic device 101 and a USB plug (e.g., the USB plug 120 in FIG. 4A) of the external device 350 are connected to each other using the high speed interface. The processor 920 may close a first switch (e.g., the first switch 416 in FIG. 4A), close a second switch (e.g., the second switch 426 in FIG. 4A), and open a third switch (e.g., the third switch 427 in FIG. 4A) in the first section. The processor 920 may determine whether the external device 350 is connected. For example, the processor 920 may monitor whether an impedance between the high speed interface (e.g., the first interface 341 in FIG. 3) and the external device 350 is equal to or smaller than a specified value, thereby determining whether the external device 350 is connected.

In operation 520, the processor 920 of the electronic device 101 according to an embodiment may transmit and/or receive the data to and/or the external device 350 using the high speed interface in the first section. The first section may be a section in which the data is transmitted. The processor 920 may transmit data for the external device 350 to perform an operation using the high speed interface. For example, when the external device 350 is the headset, the processor 920 may transmit audio data using the high speed interface.

In operation 530, the processor 920 of the electronic device 101 according to an embodiment may connect a first circuit portion (e.g., the first circuit portion 412 in FIG. 4A) to a second circuit portion (e.g., the second circuit portion 422 in FIG. 4A) of the external device 350 in at least a portion of a second section other than the first section in the first frame. The second section may be a section that maintains the standby state until a start time point of the next frame after the data is transmitted. The second section may be a section in which the USB connector 113 of the electronic device 101 and the USB plug 120 of the external device 350 are connected to each other using a disconnection sensing path (e.g., the dotted arrow path in FIG. 4A) formed as the first circuit portion 412 and the second circuit portion 422 are connected to each other. The processor 920 may open the first switch 416, open the second switch 426, and close the third switch 427 in the at least a portion of the second section. The processor 920 may determine whether the voltage level of the USB connector 113 changes by the specified value or greater in the disconnection sensing path.

Figure 6:
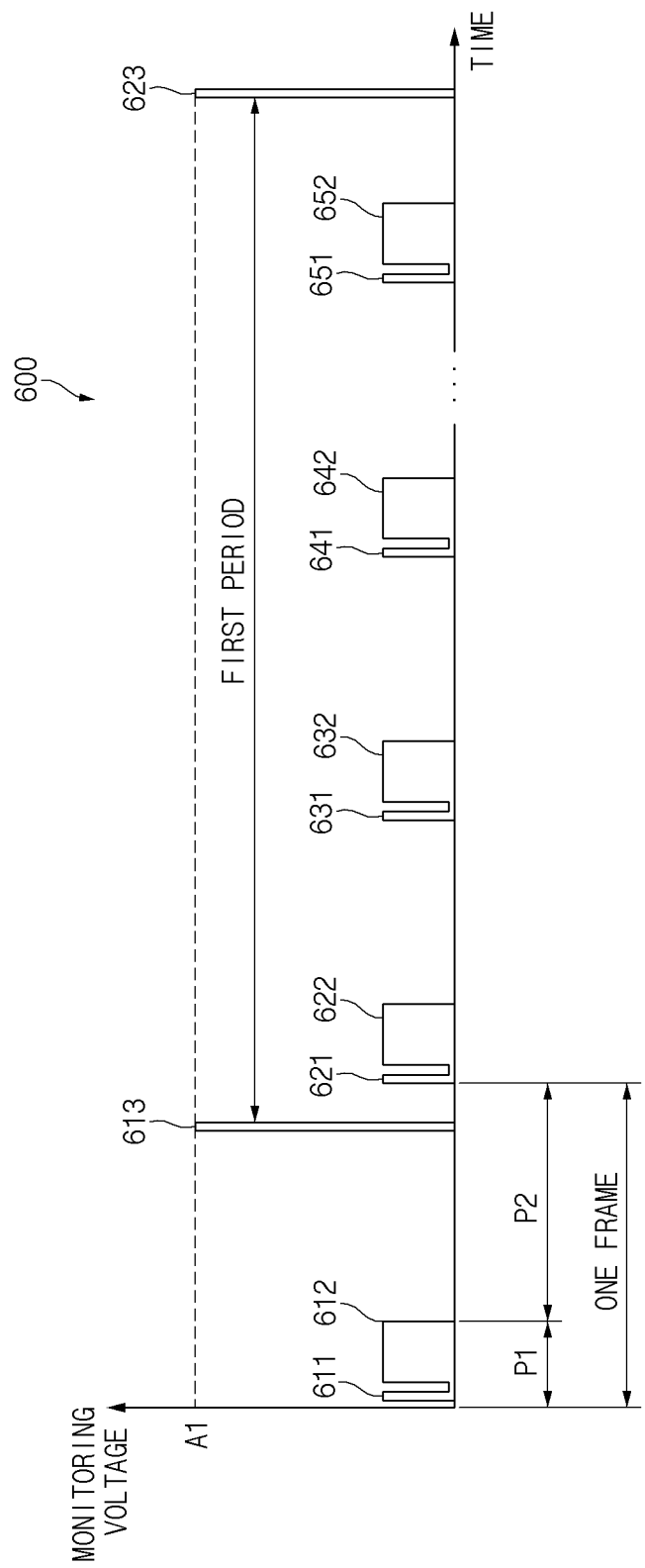
FIG. 6 is a view showing a monitoring voltage over time of an electronic device according to an embodiment.

FIG. 6 is a view 600 showing a monitoring voltage over time of the electronic device 101 according to an embodiment.

In one embodiment, a processor (e.g., the processor 920 in FIG. 9) of the electronic device 101 may output a monitoring signal 611 in a first section P1 of the first frame. For example, the processor 920 may output the monitoring signal 611 at a point in time when the first section P1 starts. The processor 920 may determine whether a USB plug (e.g., the USB plug 120 in FIG. 4A) of the external device 350 is connected to a USB connector (e.g., the USB connector 113 in FIG. 4A) of the electronic device 101 using the monitoring signal 611. For example, the processor 920 may output a monitoring voltage (e.g., the monitoring signal 611) and monitor whether the voltage of the USB connector (e.g., the USB connector 113 in FIG. 4A) of the electronic device 101 is equal to or smaller than a specified value, thereby determining whether the USB plug (e.g., the USB plug 120 in FIG. 4A) of the external device 350 is connected.

In one embodiment, the processor 920 of the electronic device 101 may transmit and/or receive data 612 in the first section P1. After determining whether the USB plug 120 is connected by outputting the monitoring signal 611, the processor 920 may transmit the data 612 to the external device 350 after determining that the USB plug 120 of the external device 350 is connected to the USB connector 113 of the electronic device 101. For example, when the external device 350 is the headset, the processor 920 may transmit the audio data in the first section P1.

In one embodiment, the processor 920 of the electronic device 101 may output a disconnection sensing signal 613 in at least a portion of a second section P2 outside the first section P1 in the first frame. The second section P2 may be extended until the start of the next frame after the transmission and/or the reception of the data 612 is completed. The processor 920 may determine whether the state in which the USB plug 120 of the external device 350 is connected to the USB connector 113 of the electronic device 101 is maintained using the disconnection sensing signal 613 in the at least a portion of the second section P2.

In one embodiment, the magnitude of the voltage level of the disconnection sensing signal 613 may be greater than the magnitude of the voltage level of the monitoring signal 611. The magnitude of the voltage level of the disconnection sensing signal 613 may be the same as that of the voltage level of a signal in the USB full speed mode. In the USB high speed mode, erroneous recognition that the connection between the USB connector 113 of the electronic device 101 and the USB plug 120 of the external device 350 is released may occur. On the other hand, in the USB full speed mode, erroneous recognition of whether the USB connector 113 of the electronic device 101 and the USB plug 120 of the external device 350 are connected to each other may not occur. In the at least a portion of the second section, a first circuit portion (e.g., the first circuit portion 412 in FIG. 4A) may be connected to a second circuit portion (e.g., the second circuit portion 422 in FIG. 4A) of the external device 350 so as to form the disconnection sensing path. The first circuit portion 412 may have higher impedance than the high speed interface 411, and the second circuit portion 422 may have higher impedance than the external high speed interface 421. The processor 920 may identify the connection state between the USB connector 113 of the electronic device 101 and the USB plug 120 of the external device 350 using the disconnection sensing signal 613 having the voltage level higher than that of the monitoring signal 611. Accordingly, the processor 920 may reduce the possibility of erroneously determining that the connection between the USB connector 113 of the electronic device 101 and the USB plug 120 of the external device 350 is released resulted from the change in the voltage level caused by the external environment.

In one embodiment, the processor 920 may output the disconnection sensing signal 613 periodically. The period of the disconnection sensing signal 613 may be equal to or greater than one frame. The period of the disconnection sensing signal 613 may have a length that is an integer multiple of the length of the one frame. For example, when the length of the one frame is about 125 μs, the length of the period of the disconnection sensing signal 613 may be about 8 ms. The period of the disconnection sensing signal 613 may be set as a time interval for determining whether the connection between the USB connector 113 of the electronic device 101 and the USB plug 120 of the external device 350 is released. The period of the disconnection sensing signal 613 may be the same as a period used in the USB full speed mode. In the USB full speed mode, erroneous recognition related to whether the USB connector 113 of the electronic device 101 and the USB plug 120 of the external device 350 are connected to each other may not occur. As the period of the disconnection sensing signal 613 increases, the possibility of erroneous recognition decreases, so that the first period may be greater than the period of the USB full speed mode. The processor 920 may identify that the connection between the USB connector 113 of the electronic device 101 and the USB plug 120 of the external device 350 is maintained by supplying the disconnection sensing signal 613 periodically. The processor 920 may reduce the possibility of erroneously determining that the connection between the USB connector 113 of the electronic device 101 and the USB plug 120 of the external device 350 is released caused by the external environment.

Figure 7:
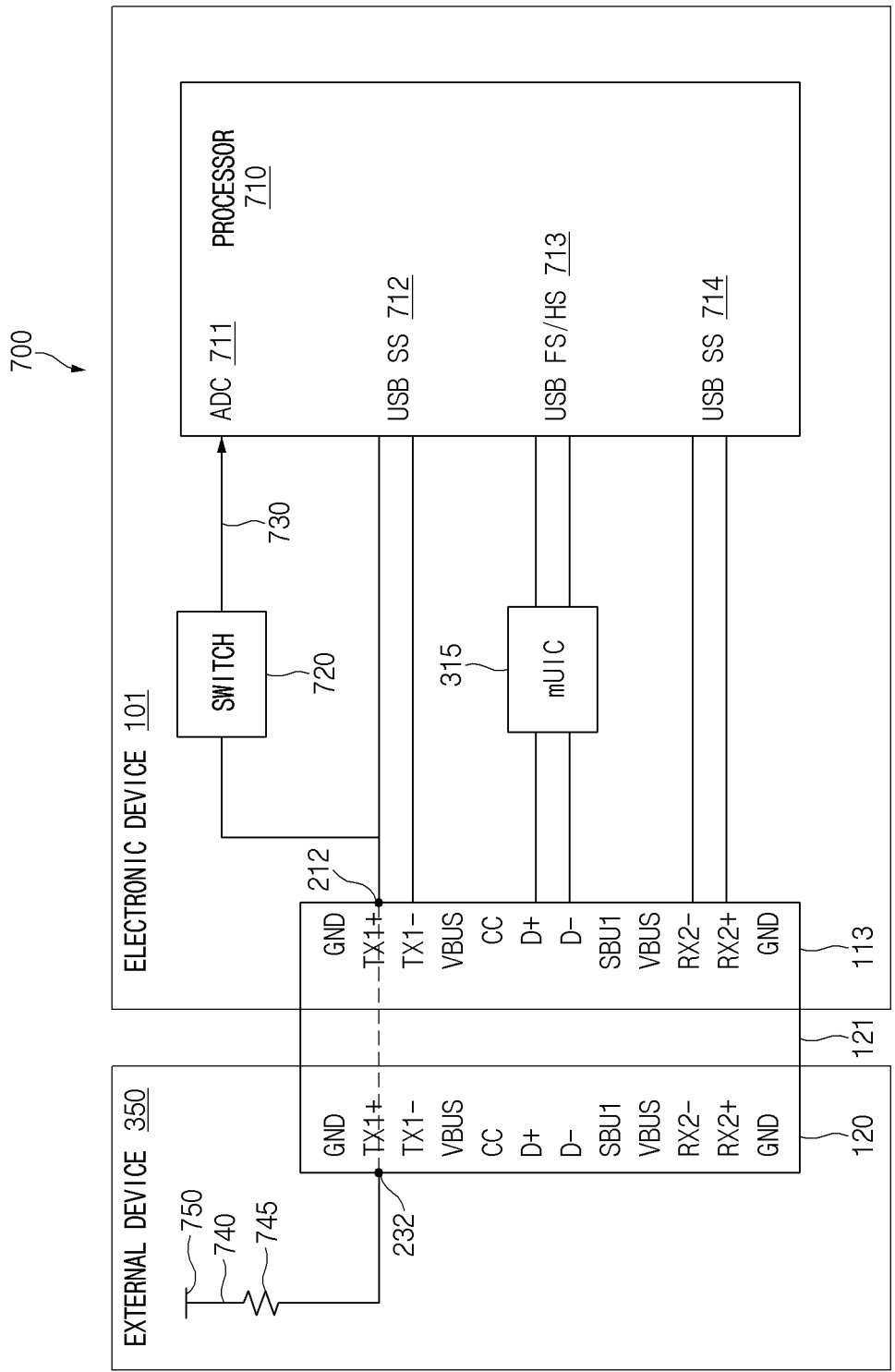
FIG. 7 is a view showing a state in which a USB plug of an external device is plugged into a USB connector of an electronic device according to another embodiment.

FIG. 7 is a view 700 showing a state in which the USB plug 120 of the external device 350 is plugged into the USB connector 113 of the electronic device 101 according to another embodiment.

In one embodiment, a processor 710 (e.g., the processor 920 in FIG. 9) of the electronic device 101 may be connected to the USB connector 113 via a plurality of interface receivers 712, 713, and 714. For example, the processor 710 may be connected to the USB connector 113 via USB SSs (super speeds) 712 and 714 and USB FS (full speed)/HS (high speed) 713. The USB FS/HS 713 may be connected to a D+ pin (e.g., the D+ pin 216 in FIG. 2) and a D-pin (e.g., the D-pin 217 in FIG. 2) of the USB connector 113 via an mUIC (micro USB IC) 315. The USB SSs 712 and 714 may be connected to the TX1+ pin 212, a TX1− pin (e.g., the TX1− pin 213 in FIG. 2), a RX2− pin (e.g., the RX2− pin 220 in FIG. 2), and a RX2+ pin (e.g., the RX2+ pin in FIG. 2) of the USB connector 113. The USB SSs 712 and 714 may transmit and/or receive data at higher speed than the USB FS/HS 713.

In one embodiment, there may be a pull-down circuit portion 730 (e.g., the first circuit portion 412 in FIG. 4A) branched from the path connecting the TX1+ pin 212 of the USB connector 113 and the USB SS 712 of the processor 710 to each other. The pull-down circuit portion 730 may be disposed so as to connect the TX1+ pin 212 of the USB connector 113 and an ADC pin 711 of the processor 710 to each other. The ADC pin 711 may be used so that the processor 710 can obtain a voltage level of the USB SS 712.

In one embodiment, a switch 720 may be disposed in the pull-down circuit portion 730. The switch 720 may selectively connect the TX1+ pin 212 of the USB connector 113 and the ADC pin 711 of the processor 710 to each other. In a first section (e.g., the first section P1 in FIG. 6) in which the TX1+ pin 212 of the USB connector 113 transmits and/or receives data to and/or from the USB SS 712, the switch 720 may be opened. In a second section (e.g., the second section P2 in FIG. 6) in which the connection between the USB connector 113 and the USB plug 120 is identified, the switch 720 may be closed.

In one embodiment, when identifying the connection between the USB connector 113 and the USB plug 120, the processor 710 may allow the TX1+ pin 232 of the external device 350 to be connected to a pull-up circuit portion 740 (e.g., the second circuit portion 422 in FIG. 4A). The pull-up circuit portion 740 may be connected to a pull-up voltage source 750. A pull-up resistor 745 may be disposed in the pull-up circuit portion 740. The pull-up resistor 745 may have an impedance value greater than that of a resistance of the high speed interface. For example, when the resistance of the high speed interface is about 100Ω, the pull-up resistor 745 may have a resistance of about 100Ω which is about 1000 times greater than the resistance of the high speed interface. The pull-up voltage source 750 may have a specified voltage level higher than the voltage level of the USB SS 712. For example, the pull-up voltage source 750 may have a voltage level of about 1.8 V.

In one embodiment, the processor 710 may form a disconnection sensing path using the pull-down circuit portion 730 and the pull-up circuit portion 740. The processor 710 may determine that the connection between the electronic device 101 and the external device 350 is released when a voltage level of the TX1+ pin 212 changes by the specified value or greater while the electronic device 101 and the external device 350 are connected to each other. For example, the processor 710 may determine that the connection between the electronic device 101 and the external device 350 is released when the voltage level of the TX1+ pin 212 decreases by about 1.5 V or greater from about 1.8 V to about 0.3 V.

In one embodiment, the processor 710 may close the switch 720 after a USB identification process. The processor 710 may use the pull-down circuit portion 730 and the pull-up circuit portion 740 after the USB identification process. Accordingly, USB connection compatibility may be maintained by preventing the use of the pull-down circuit portion 730 and the pull-up circuit portion 740 during the identification and connection preparation of the USB.

Figure 8:
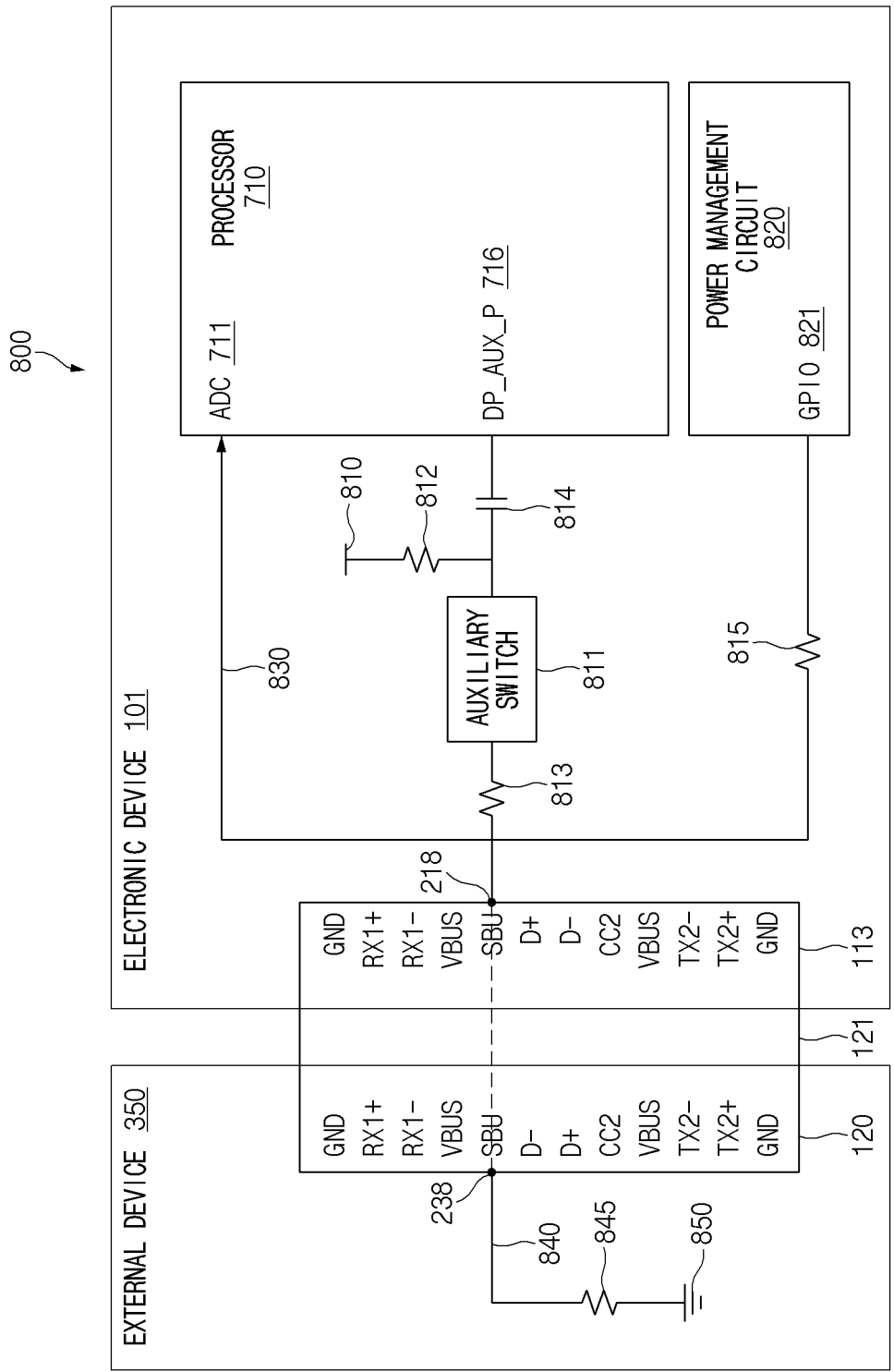
FIG. 8 is a view showing a state in which a USB plug of an external device is plugged into a USB connector of an electronic device according to another embodiment.

FIG. 8 is a view 800 showing a state in which the USB plug 120 of the external device 350 is plugged into the USB connector 113 of the electronic device 101 according to another embodiment.

In one embodiment, the processor 710 (e.g., the processor 920 in FIG. 9) of the electronic device 101 may be connected to the USB connector 113 via an auxiliary interface receiver 716. For example, the processor 710 may be connected to the USB connector 113 via a DP_AUX_P.

In one embodiment, a voltage source 810, an auxiliary switch 811, resistors 812 and 813, and/or a capacitor 814 may be arranged between the USB connector 113 and the auxiliary interface receiver 716. The voltage source 810 may maintain a voltage level higher than that of the auxiliary interface receiver 716. For example, the voltage source 810 may maintain a voltage level of about 3.0 V. The auxiliary switch 811 may selectively connect the SBU pin 218 of the USB connector 113 to the voltage source 810.

Figure 9:
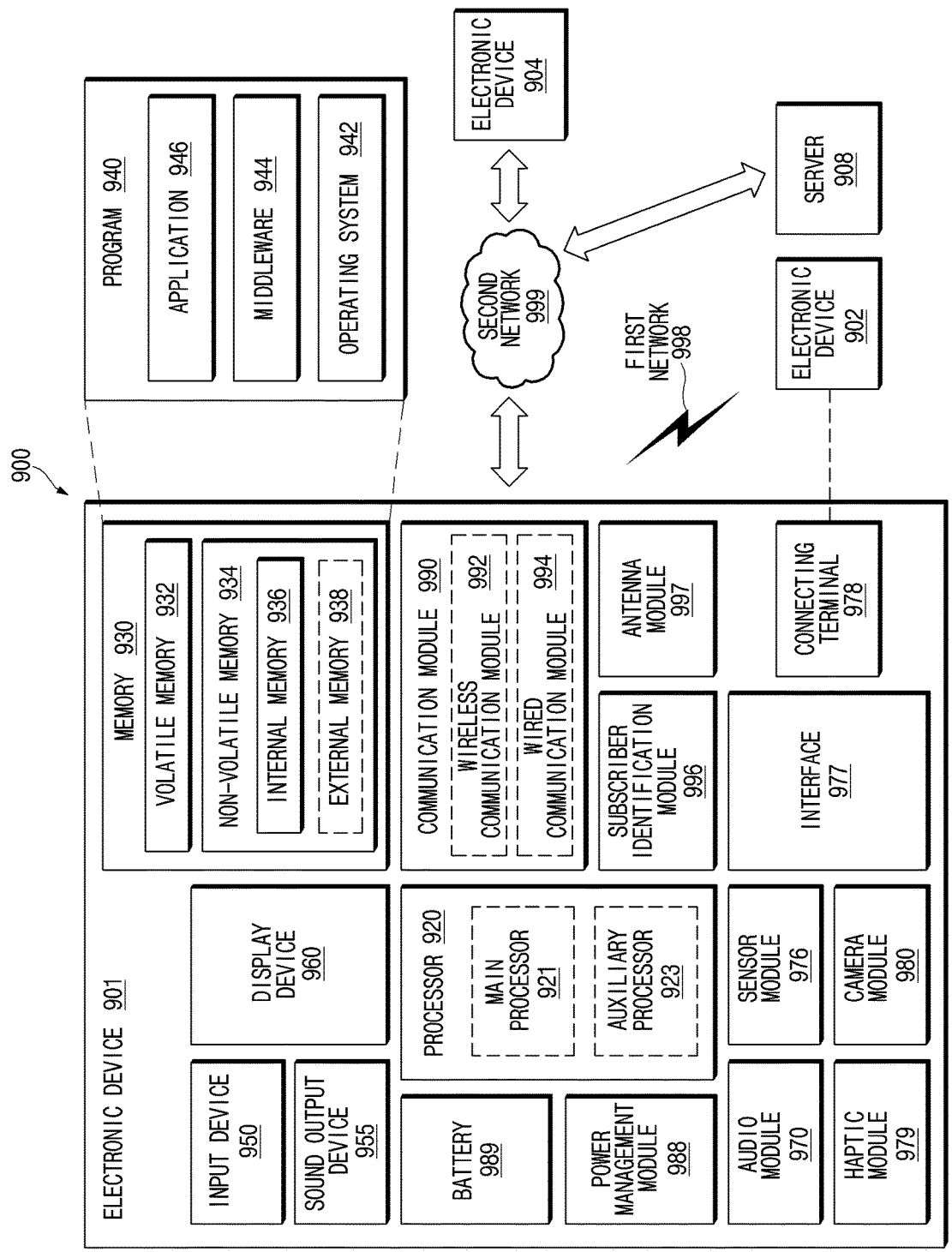
FIG. 9 is a block diagram illustrating an electronic device in a network environment according to various embodiments.

In one embodiment, the SBU pin 218 of the USB connector 113 may be connected to a power management circuit 820 (e.g., the power management module 988 in FIG. 9). The SBU pin 218 may be connected to a general-purpose input/output (GPIO) pin 821 of the power management circuit 820. A resistor 815 may be disposed between the SBU pin 218 and the GPIO pin 821.

In one embodiment, a pull-up circuit portion 830 branched from the path connecting the SBU pin 218 of the USB connector 113 and the auxiliary interface receiver 716 of the processor 710 to each other may be disposed. The pull-up circuit portion 830 may be arranged to connect the SBU pin 218 of the USB connector 113 and the ADC pin 711 of the processor 710 to each other. The ADC pin 711 may maintain a specified voltage level higher than the voltage level of the auxiliary interface receiver 716. The ADC pin 711 may acquire the voltage level of the SBU pin 218 of the USB connector 113.

In one embodiment, the processor 710 (e.g., the processor 920 in FIG. 9) may allow the SBU pin 238 of the external device 350 to be connected to a pull-down circuit portion 840 when identifying the connection between the USB connector 113 and the USB plug 120. The pull-down circuit portion 840 may be connected to an external ground portion 850. The external ground portion 850 may maintain the ground voltage level of 0 V. A pull-down resistor 845 may be disposed in the pull-down circuit portion 840. The pull-down resistor 845 may have an impedance value greater than that of the resistance of the high speed interface. For example, when the resistance of the high speed interface is about 100Ω, the pull-up resistor 745 may have a resistance of about 100Ω which is about 1000 times greater than the resistance of the high speed interface.

In one embodiment, the processor 710 may form a disconnection sensing path using the pull-up circuit portion 830 and the pull-down circuit portion 840. The processor 710 may determine that the connection between the electronic device 101 and the external device 350 is released when the voltage level of the SBU pin 218 changes by the specified value or greater while the electronic device 101 and the external device 350 are connected to each other. For example, when the voltage level of the TX1+ pin 212 increases by 1.2 V or greater from about 1.5 V to a voltage level equal to or lower than 2.7 V, the processor 710 may determine that the connection between the electronic device 101 and the external device 350 is released.

In one embodiment, the processor 710 may close the auxiliary switch 811 after the USB identification process. The processor 710 may use the pull-up circuit portion 830 and the pull-down circuit portion 840 after the USB identification process. Accordingly, USB connection compatibility may be maintained by preventing the use of the pull-up circuit portion 830 and the pull-down circuit portion 840 during the identification and the connection preparation of the USB.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908.

According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module(SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module).

A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a housing;
    a USB connector formed at one side of the housing and connected to a USB plug of an external device;
    a high speed interface for transmitting and/or receiving data to and/or from the external device connected to the USB connector;
    a voltage source for supplying a first voltage to the high speed interface;
    a first circuit portion connected to a ground portion having a second voltage lower than the first voltage and having a second impedance higher than a first impedance of the high speed interface; and
    a processor,
    wherein the processor is configured to:
        monitor the external device using the high speed interface in a first section of a first frame;
        transmit and/or receive the data to and/or from the external device using the high speed interface in the first section;
        connect the first circuit portion to a second circuit portion of the external device so as to form a disconnection sensing path in at least a portion of a second section other than the first section in the first frame; and
        determine whether a connection between the USB connector and the USB plug is released using the disconnection sensing path,
    wherein the second circuit portion has a fourth impedance higher than a third impedance of an external high speed interface of the external device.

2. The electronic device of claim 1, further comprising:
    a disconnection sensing driver for determining whether the data is transmitted at a specified interval through a path where the high speed interface and the external high speed interface are connected to each other.

3. The electronic device of claim 1, wherein the high speed interface includes a first switch for selectively connecting the high speed interface to the USB connector,
    wherein the external high speed interface includes a second switch for selectively connecting the external high speed interface to the USB plug,
    wherein the second circuit portion includes a third switch for selectively connecting the second circuit portion to the USB plug.

4. The electronic device of claim 3, wherein the processor is configured to control opening/closing timing of the first switch, the second switch, and the third switch.

5. The electronic device of claim 4, wherein the processor is configured to close the first switch, close the second switch, and open the third switch when the data is transmitted at a specified interval.

6. The electronic device of claim 4, wherein the processor is configured to open the first switch, open the second switch, and close the third switch when a voltage outside of a specified voltage range is sensed by the USB connector.

7. The electronic device of claim 4, wherein the processor is configured to close the first switch, close the second switch, and open the third switch when a voltage level of the USB connector remains within a specified range after the first circuit portion and the second circuit portion are connected to each other.

8. The electronic device of claim 1, wherein the first impedance is a pull-up resistor connected to the voltage source,
    wherein the second impedance is a pull-down resistor connected to the ground portion.

9. The electronic device of claim 1, wherein the processor is configured to determine that the connection between the USB connector and the USB plug is released when a voltage level of the USB connector changes by a specified value or greater after the first circuit portion and the second circuit portion are connected to each other.

10. The electronic device of claim 1, wherein the processor is configured to output a monitoring signal for determining whether the USB plug is connected at a point in time when the first section of the first frame starts.

11. The electronic device of claim 10, wherein the processor is configured to determine whether the USB plug is connected in the first section of the first frame, and then, transmit the data to the external device after determining whether the USB plug is connected.

12. The electronic device of claim 11, wherein the processor is configured to output a disconnection sensing signal having a voltage level higher than a voltage level of the monitoring signal in the at least a portion of the second section.

13. The electronic device of claim 12, wherein the voltage level of the disconnection sensing signal is the same as a voltage level of a signal of a USB full speed mode.

14. The electronic device of claim 12, wherein the processor is configured to output the disconnection sensing signal periodically at a period having a length equal to or greater than the first frame.

15. The electronic device of claim 14, wherein the period is equal to or greater than a period of a USB full speed mode.

16. A method for sensing disconnection of an electronic device, comprising:
    monitoring an external device using a high speed interface with a first impedance in a first section of a first frame;
    transmitting and/or receiving data to and/or from the external device using the high speed interface in the first section;
    connecting a first circuit portion having a second impedance higher than the first impedance to a second circuit portion of the external device so as to form a disconnection sensing path in at least a portion of a second section other than the first section in the first frame; and
    determining whether a connection between a USB connector and a USB plug is released using the disconnection sensing path, wherein the second circuit portion has a fourth impedance higher than a third impedance of an external high speed interface of the external device.

17. The method of claim 16, wherein the determining further comprises:
   determining that the connection between the USB connector and the USB plug is released when a voltage level of the USB connector changes by a specified value or greater after the first circuit portion and the second circuit portion are connected to each other.

18. The method of claim 16, wherein the monitoring further comprises:
   outputting a monitoring signal for determining whether the USB plug is connected at a point int time when the first section of the first frame starts.

19. The method of claim 18, wherein the transmitting and/or receiving the data further comprises:
   determining whether the USB plug is connected in the first section of the first frame; and
   transmitting the data to the external device after determining whether the USB plug is connected.

20. The method of claim 19, further comprising:
   outputting a disconnection sensing signal having a voltage level higher than a voltage level of the monitoring signal in the at least a portion of the second section.

* * * * *